US010507523B2

(12) United States Patent
Janssen et al.

(10) Patent No.: US 10,507,523 B2
(45) Date of Patent: Dec. 17, 2019

(54) METALLURGICAL VESSEL LINING WITH CONFIGURED PERFORATION STRUCTURE

(71) Applicant: VESUVIUS CRUCIBLE COMPANY, Wilmington, DE (US)

(72) Inventors: Dominique Janssen, McKees Rocks, PA (US); Roger Maddalena, Pittsburgh, PA (US); Jose Simoes, St. Ghilsain (BE); Babu Patel, Findlay, OH (US); Sunilkumar C. Pillai, Upper St. Clair, PA (US)

(73) Assignee: VESUVIUS USA CORPORATION, Champaign, IL (US)

( * ) Notice: Subject to any disclaimer, the term of this patent is extended or adjusted under 35 U.S.C. 154(b) by 99 days.

(21) Appl. No.: 15/559,438

(22) PCT Filed: Feb. 24, 2016

(86) PCT No.: PCT/US2016/019280
§ 371 (c)(1),
(2) Date: Sep. 19, 2017

(87) PCT Pub. No.: WO2016/153693
PCT Pub. Date: Sep. 29, 2016

(65) Prior Publication Data
US 2018/0078999 A1    Mar. 22, 2018

Related U.S. Application Data

(60) Provisional application No. 62/137,498, filed on Mar. 24, 2015.

(51) Int. Cl.
*B22D 41/02*    (2006.01)
*C04B 35/10*    (2006.01)
(Continued)

(52) U.S. Cl.
CPC ............. *B22D 41/02* (2013.01); *B22D 41/08* (2013.01); *C04B 35/04* (2013.01); *C04B 35/10* (2013.01); *C04B 35/62222* (2013.01)

(58) Field of Classification Search
CPC ........ B22D 41/02; B22D 41/08; C04B 35/04; C04B 35/10; C04B 35/62222; B22C 1/00
(Continued)

(56) References Cited

U.S. PATENT DOCUMENTS 4,149,705 A * 4/1979 Caudill ................. B22D 41/02
264/30
4,339,115 A 7/1982 Daussan et al.
(Continued)

FOREIGN PATENT DOCUMENTS

CA    2170530 A1    3/1995
CN    2632609 Y    8/2004
(Continued)

*Primary Examiner* — Scott R Kastler
*Assistant Examiner* — Michael Aboagye
(74) *Attorney, Agent, or Firm* — Thomas Clinton; Donald M. Satina (57) ABSTRACT

A lining for a metallurgical vessel is configured to have an engineered porosity. The lining contains a plurality of regions, each extending in a primary plane of the lining, each region having a differing value of total pore or perforation area as measured in a primary plane of the lining. The lining may be used to form part or all of the working surface of the floors or walls of the vessel. In casting use the lining produces an oxidation buffering layer at an interphase of metal melt extending from the interface between metal melt and the walls and floor of the metallurgical vessel, such that when in casting use, the metal flow rate in said oxidation buffering layer is substantially nil, and the concentration of
(Continued)

endogenous inclusions, in particular oxides, in said oxidation buffering layer is substantially higher than in the bulk of the metal melt.

16 Claims, 6 Drawing Sheets

(51) Int. Cl.
*C04B 35/04* (2006.01)
*C04B 35/622* (2006.01)
*B22D 41/08* (2006.01)

(58) Field of Classification Search
USPC ............ 222/591, 590; 266/275, 280, 286; 432/164
See application file for complete search history.

(56) References Cited

U.S. PATENT DOCUMENTS

| | | | | |
|---|---|---|---|---|
| 5,840,625 A * | 11/1998 | Feldner | ............ | H01L 21/76807 438/626 |
| 6,812,139 B2 * | 11/2004 | Givens | ............... | H01L 23/485 257/E23.019 |
| 8,723,325 B2 * | 5/2014 | Chen | ..................... | H01L 24/03 257/774 |
| 9,023,486 B2 * | 5/2015 | Nagaraj | ................ | C04B 35/486 428/623 |
| 2007/0080335 A1 | 4/2007 | Forbes et al. | | |
| 2009/0273010 A1 | 11/2009 | Simoen et al. | | |
| 2010/0119425 A1 | 5/2010 | Palmer | | |
| 2010/0289195 A1 | 11/2010 | Ohashi et al. | | |
| 2012/0126467 A1 | 5/2012 | Barrett et al. | | |
| 2014/0377473 A1 | 12/2014 | Nagaraj et al. | | |
| 2015/0184311 A1 | 7/2015 | Turenne et al. | | |

FOREIGN PATENT DOCUMENTS

| | | |
|---|---|---|
| EP | 1222982 B1 | 7/2002 |
| FR | 2717720 A1 | 9/1995 |
| JP | H107236966 A | 9/1995 |
| TW | 353633 B | 3/1999 |
| TW | 360570 B | 6/1999 |
| TW | 201404950 A | 2/2014 |

* cited by examiner

Fig. 1

Prior Art

METALLURGICAL VESSEL LINING WITH CONFIGURED PERFORATION STRUCTURE

FIELD OF THE INVENTION

The present invention generally relates to metal forming lines such as continuous metal casting lines. In particular, it relates to a lining for a metallurgical vessel, such as a tundish, capable of reducing substantially the formation of oxide inclusions in the metal melt.

BACKGROUND OF THE INVENTION

In metal forming processes, metal melt is transferred from one metallurgical vessel to another, to a mould or to a tool. For example, a tundish of large capacity is regularly fed with metal melt by a ladle transferring metal melt from a furnace to the tundish. This allows the continuous casting of metal from the tundish to a tool or mould. Flow of metal melt out of metallurgic vessels is driven by gravity through nozzle systems located at the bottom of the vessels, usually provided with a gate system to control (open or close) the flow of metal melt through said nozzle system. In order to resist the high temperatures of metal melts, the walls of the vessels are lined with refractory material.

Metal melts, in particular steel, are highly reactive to oxidation and must therefore be sheltered from any source of oxidative species. Small amounts of aluminum are often added to passivate the iron in case oxidative species enter into contact with the melt. In practice, it appears that often this is not enough to prevent the formation of oxide inclusions in the melt that produce defects in a final part produced from the melt. It is reported that a 10 kg steel casting may contain up to one billion non-metallic inclusions, most of them being oxides. Inclusions must be removed from the final part by grinding or cutting; these procedures add to the production cost and generate large amounts of scrap.

Inclusions may be the result of reactions with the metal melt; these inclusions are known as endogenous inclusions. Exogenous inclusions are those in which materials not resulting from the metal melt, such as sand, slag, and debris of nozzles; exogenous inclusions are generally thicker than endogenous inclusions.

Endogenous inclusions comprise mostly oxides of iron (FeO), aluminium ($Al_2O_3$), and of other compounds present in, or in contact with the melt, such as MnO, $Cr_2O_3$, $SiO_2$, $TiO_2$. Other inclusions may comprise sulfides and, to a minor extent, nitrides and phosphides. Since metal melts are at very high temperatures (of the order of 1600° C. for low carbon steels) it is clear that the reactivity of an iron atom with an oxide is very high and reaction cannot be prevented.

To date, most measures to reduce the presence of inclusions in a steel casting is to retain them in the metallurgical vessel in which they were formed. The present invention proposes a radically different solution by reducing substantially the formation of endogenous inclusions in a metallurgical vessel with simple, reliable, and economical means.

SUMMARY OF THE INVENTION

The present invention is defined by the attached independent claims. The dependent claims define various embodiments. In particular, the present invention concerns a lining for a metallurgical vessel for casting a metal melt. Examples of such metallurgical vessels comprise a floor, surrounded by walls over the whole perimeter of said floor, and an outlet, or multiple outlets, located on said floor characterized in that at least a portion of the floor and/or of the walls comprise means for creating in casting use an oxidation buffering layer at an interphase of metal melt extending from the interface between metal melt and the walls and floor of the metallurgical vessel, such that when in casting use, the metal flow rate in said oxidation buffering layer is substantially nil, and the concentration of endogenous inclusions, in particular oxides, in said oxidation buffering layer is substantially higher than in the bulk of the metal melt.

In a particular embodiment, the structure for creating in casting use an oxidation buffering layer comprises a porous immobilizing layer lining said floor and at least some of the walls of the vessel, said immobilizing layer having an open porosity, with pores or perforations of diameter and surface energy such as to allow penetration therein by a metal melt, said highly porous immobilizing layer being made of a substantially non oxidative material with respect to said metal melt. The metal may remain in the molten form in the immobilizing layer, or may be partially or completely converted to the solid state in the immobilizing layer. A perforation is a channel or passage through a layer, enabling a fluid to pass from one side of the layer to the other. The metal melt penetrating into the porosity or perforation of this immobilizing layer becomes prisoner of the porous or perforated structure, which acts like a cage; the flow rate becomes substantially nil. As it is in close contact with the refractory material lining the walls and floor of a metallurgical vessel, said refractory material being identified as a major source of reagents for the formation of endogenous inclusions, be it by diffusion of the ambient air or by reaction of some of the components thereof, the metal layer trapped in the immobilizing layer comprises a concentration of endogenous inclusions much higher than the bulk of the metal melt.

The perforated or highly porous immobilizing layer or honeycomb structure may be made of materials such as magnesia, alumina, zirconia, mullite, and combinations of these materials.

In another particular embodiment of the invention, the porous or perforated structure is configured to have a plurality of planar regions, orthogonal to a direction of through porosity, having differing numerical values of pore or perforation area. In an example of this embodiment of the invention, the porous or perforated structure contains individual pores or perforations having a larger pore or perforation cross-sectional area adjacent to one face of the pore or perforation structure, and a smaller pore or perforation cross-sectional area adjacent to another face of the pore or perforation structure.

BRIEF DESCRIPTION OF THE FIGURES

Various embodiments of the present invention are illustrated in the attached Figures.

DETAILED DESCRIPTION OF THE INVENTION

Figure 1:
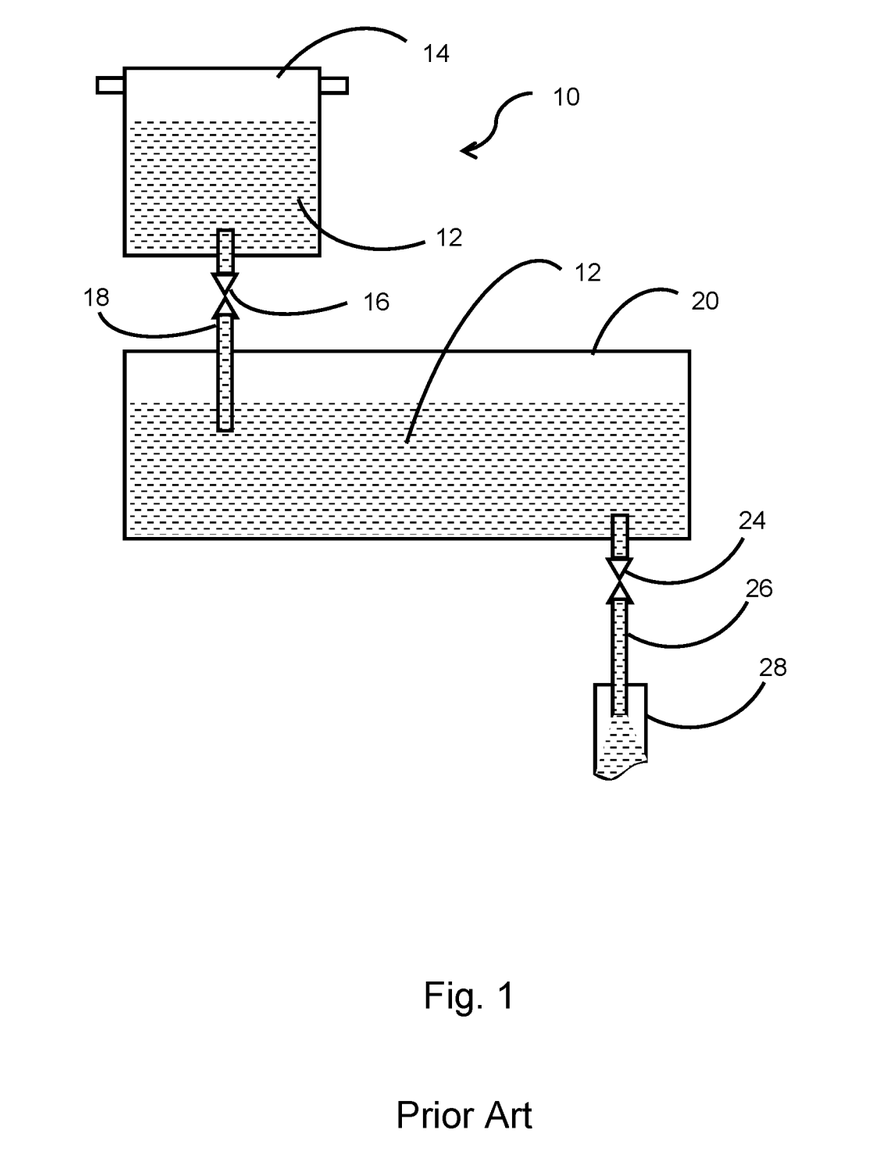
FIG. 1 shows schematically the various components of a typical continuous metal casting line.

As can be seen in the depiction of a casting apparatus (10) in FIG. 1, a tundish is generally provided with one or several outlets generally located at one or both ends of the vessel, and away from the point where metal melt (12) is fed from a ladle (14). Metal melt exits the ladle (14) through a ladle valve (16) and ladle nozzle system (18) into tundish (20), and exits tundish 20 through tundish valve (24) and tundish nozzle system (26) into mould (28). A tundish acts much like a bath tub with open tap and open outlet, creating flows of metal melt within the tundish. These flows contribute to a homogenization of the metal melt and also to the distribution within the bulk of any inclusions. Concerning endogenous inclusions, it was suspected that the reaction rate (mostly oxidation) is strongly controlled by the diffusion of reactive molecules. This assumption was confirmed by an experiment, wherein a low carbon steel melt was held in a crucible placed in a conditioning chamber free of oxygen. A pipe was introduced into said metal melt and oxygen was injected at low rate. After a time, the metal melt was left to solidify and the composition of the ingot thus obtained was analyzed. As expected, the oxidized region was limited to a small region around the outlet of the oxygen pipe, thus confirming the assumption that oxidization reaction is strongly diffusion controlled. It follows that if metal flow can be stopped, oxidation would stop too. Of course, this is not possible in a continuous casting operation which, as its name indicates, is characterized by a continuous flow of metal melt.

The second assumption which led to the present invention was that oxidation reagents originate at the walls and floor of the metallurgical vessel. In particular, it is believed that oxidation reagents come from two main sources:
(a) Reactive oxides of the refractive lining, in particular silicates such as olivine (($Mg,Fe)_2SiO_4$); and
(b) Air and moisture diffusing from ambient through the refractory lining of the metallurgical vessel and emerging at the surface of the floor and walls of said vessel (e.g., a tundish).

This second assumption was validated by lab tests.

The solution, therefore, proceeded from these two starting assumptions:
(a) Metal oxidation reaction rate is diffusion controlled, and
(b) Metal oxidation reagents are fed to the melt from the walls and floor of a metallurgical vessel.

The inventors have proposed the following solution for preventing the formation of endogenous inclusions in the bulk of the metal melt. If it were possible to immobilize the atoms forming the metal melt close to the source of oxidative species, i.e., the walls and floor of a metallurgical vessel, a "passivating layer" or a "buffering layer" would form which would be left to oxidize but, since diffusion is very slow and absent any significant flow, the oxidation reaction would not spread to the bulk of the metal melt. This principle is illustrated schematically in FIG. 4, wherein the flow rate, Q, of metal melt is substantially zero over a distance, δ, from the wall or floor lined with a refractory material. This interphase of thickness, δ, is called herein an "oxidation buffering layer." In said layer, the concentration of oxides is substantially higher than in the bulk of the metal melt. The reason is that the source of oxidation species is the walls and floor of the metallurgical vessel. Since the flow rate in the oxidation buffering layer is nearly zero, the oxidation reaction is diffusion controlled and therefore does not spread rapidly. Above said oxidation buffering layer, however, the flow rate of the metal melt increases and oxidation reaction would spread more rapidly but, absent any oxidation reagents, only very limited oxidation reactions take place above the buffering layer.

It is clear that although oxidation reactions have been mentioned in the above explanation, the same applies mutatis mutandis to other reactions such as the formation of sulfides, nitrides, and phosphides, which reaction rates with atoms such as Fe are also diffusion controlled.

Various devices or means for forming an oxidation buffering layer can be proposed. In a first embodiment, the device takes the form of a perforated lining structure. This perforated lining structure may be monolithic or may be composed of a plurality of components. The perforated lining structure may be used to line part or all of the floor of a refractory vessel, and may be used to line part or all of the walls of a refractory vessel. The pores or perforations of the lining structure have a diameter and surface energy such as to allow penetration therein by a metal melt. The lining structure is made of a substantially non oxidative material with respect to the metal melt.

The lining structure should be made of a material not reactive with metal melts, in particular low carbon steels. Certain embodiments of the invention are characterized by the absence of silicates. The materials used for making tundish foam filters are suitable for making the lining structure of the present invention. In particular, zirconia, alumina, magnesia, mullite and a combination of these materials may be suitable for forming the lining structure of the present invention and are readily available on the market.

The pores or perforations of the lining structure have a wall surface energy compatible with the metal liquid being cast, and permit metal melt to pass through the thickness of the lining structure until it reaches manifold volumes within the lining structure, and the refractory lining forming the inner walls and floor of the metallurgical vessel. The manifold volumes are configured to maximize the area of the metal melt in contact with the refractory lining. The metal atoms in contact with the refractory lining enter in contact with oxidation reagents, such as diffusing oxygen or components of the refractory lining, and rapidly react forming oxides, in particular FeO in low carbon steel melts. The metal melt, however, is trapped within the pores or perforations, and manifold volumes, and cannot flow. Since the diffusion controlled spreading of the oxidation reactions is very slow in still metal melts, the reaction will propagate extremely slowly through the thickness, δ, of the lining structure. The metal melt flowing over the lining structure is therefore not contacted by oxidation reagents until the oxidation reaction has proceeded through the thickness, δ, of the layer, which can take longer than a casting operation.

It is clear from the above explanation that foam materials traditionally used as filters in casting operations can be used for forming an oxidation buffering layer, but they are not used as filters, through which the metal flows in and out, but to restrict the flow of metal. In an embodiment of the present invention, a first material with a first porosity, or first summed cross-sectional perforation area, is used as a first layer in contact with the body of the metal melt, and a second material with a second porosity, or second open volume summed maximum cross-sectional area, is used as a second layer, disposed between the first layer and a third, backing layer of a lining structure. The second porosity, or second open volume summed maximum cross-sectional area of the second material in this embodiment is greater than the first porosity, or first summed cross-sectional perforation area, of the first material.

As an alternative to foam panels, honeycomb panels can be used in certain embodiments of the invention. These are used in addition to, and over, the backing lining, and not as a replacement of the backing lining. The axis of the honeycomb cells (i.e., extending from one opening to the other) should be normal to the wall or floor it is applied to. Each cell can act, depending on the position in which the panel is used in the lining, as either a first layer in which the cells act as pores or perforations and control the flow of melt to a second layer with greater porosity or cross-sectional manifold volume area as measured in a plane parallel to the panel major plane, or as a second layer, in which the cells of the panel act as manifold volumes and have, in sum, a greater cross-sectional area of manifold volumes, as measured in a plane parallel to the panel major plane, than the overlaying first layer has total cross-sectional area of porosity, as measured in a plane parallel to the panel major plane. Honeycomb structures are characterized by hexagonal cells. Other cell geometries, such as cells having circular or square cross-sections may also be suitable. Zirconia, alumina, magnesia, mullite and combinations thereof may be used for the honeycomb panels.

In another embodiment of the invention, a refractory vessel having a backing layer is provided with ribs or protrusions extending into the interior of the vessel. A first layer having pores or perforations is installed on the interior of the refractory vessel so that a major surface of the first layer is in contact with the ribs or protrusions of the backing layer. The ribs or protrusions are configured so that manifold volumes are defined between the major surface of the first layer facing away from the body of the metal melt and the surface of the backing layer facing towards the body of the metal melt. The spacing between the major surface of the first layer facing away from the body of the metal melt and the surface of the backing layer facing towards the body of the metal melt may be in the range from and including 1 mm to and including 50 mm, from and including 1 mm to and including 30 mm, from and including 1 mm to and including 20 mm, and from and including 2 mm to and including 30 mm.

According to the present invention, a lining structure for a refractory vessel may comprise (a) a first layer having a first layer first major surface and a first layer second major surface disposed opposite to the first layer first major surface, and (b) a second layer having a second layer first major surface and a second layer second major surface disposed opposite to the second layer first major surface, wherein the first layer second major surface is in contact with the second layer first major surface, wherein the first layer comprises a plurality of pores or perforations passing from the first layer major surface to the first layer second major surface, wherein the second layer comprises at least one manifold volume, wherein the at least one manifold volume is in fluid communication with at least one first layer pore or perforation, and wherein the at least one manifold volume is in fluid communication with the second layer second major surface; and wherein the summed cross-sectional area of all pores or perforations in the first layer is less than the summed maximum cross-sectional area of all manifold volumes in the second layer.

In particular embodiments of the invention, the first layer and second layer may comprise a single monolithic structure. The lining structure may be comprised of zirconia, alumina, magnesia or mullite, or combinations of these materials. The summed maximum cross-sectional area of all manifold volumes in the second layer may be at least a factor of 10, at least a factor of 30, at least a factor of 100, at least a factor of 300, at least factor of 1000, at least a factor of 3000, or at least a factor of 10000 greater than the summed cross-sectional area of all pores or perforations in the first layer. The second layer may comprise a plurality of stand-off structures protruding from the second major surface of the first layer. The second layer may comprise a plurality of alcoves having interiors and opening in the direction of the second layer second major surface, and the interiors of the alcoves may comprise manifold volumes. The second layer may comprise a plurality of grooves having interiors and opening in the direction of the second layer second major surface, and the interiors of the alcoves may comprise manifold volumes. The second layer may also comprise a plurality of standoff structures in communication with the first layer and the third layer. The standoff structures may be formed in any suitable geometry, such as spheres, cylinders, conic sections, or prisms of polygons. The first layer and third layer may be provided with receiving geometries so that the standoff structures are immobilized when the first layer is installed with respect to the third layer.

In particular embodiments of the invention, the first layer has a thickness in the range from and including 5 mm to and including 150 mm, in the range from and including 5 mm to and including 100 mm, in the range from and including 10 mm to and including 150 mm, or in the range from and including 10 mm to and including 100 mm. In particular embodiments of the invention, the second layer has a thickness in the range from and including 1 mm to and including 50 mm, range from and including 2 mm to and including 50 mm, the range from and including 5 mm to and including 50 mm, the range from and including 1 mm to and including 25 mm, range from and including 2 mm to and including 25 mm, and the range from and including 5 mm to and including 25 mm.

The lining structure of the present invention may further include a nonperforated third or backing layer having a third layer first major surface in contact or communication with the second layer second major surface. The second layer may be formed from, or have a thickness defined by, a plurality of stand-off structures protruding from the third layer first major surface.

The pores or perforations in the first layer may have a flared geometry at their intersection with the first layer major surface. The pores or perforations may have a cross-section geometry selected from the group consisting of circular geometry, elliptical geometry, oval geometry, square geometry, rectangular geometry, polygonal geometry, parallelogram geometry, and lens geometry. The pores or perforations have a minimum cross-sectional diameter from and including 2 mm to and including 50 mm, from and including 2 mm to and including 40 mm, from and including 2 mm to and including 25 mm, and from and including 2 mm to and including 15 mm. The pores or perforations may take the form of channels or slits defined by spacing between adjacent panels forming the first layer, wherein the channels or slits provide fluid communication between the first layer first major surface and the first layer second major surface.

The present invention also relates to the use of the lining structure as previously described in a refractory vessel, and to a metallurgical vessel having an interior and an exterior, wherein the interior of the metallurgical vessel comprises a lining structure as previously described.

The present invention also relates to a process for the minimization of oxidation of a molten metal during transfer, comprising (a) transferring molten metal to a vessel having a lining structure as previously described, and (b) transferring the molten metal out of the vessel.

Figure 2:
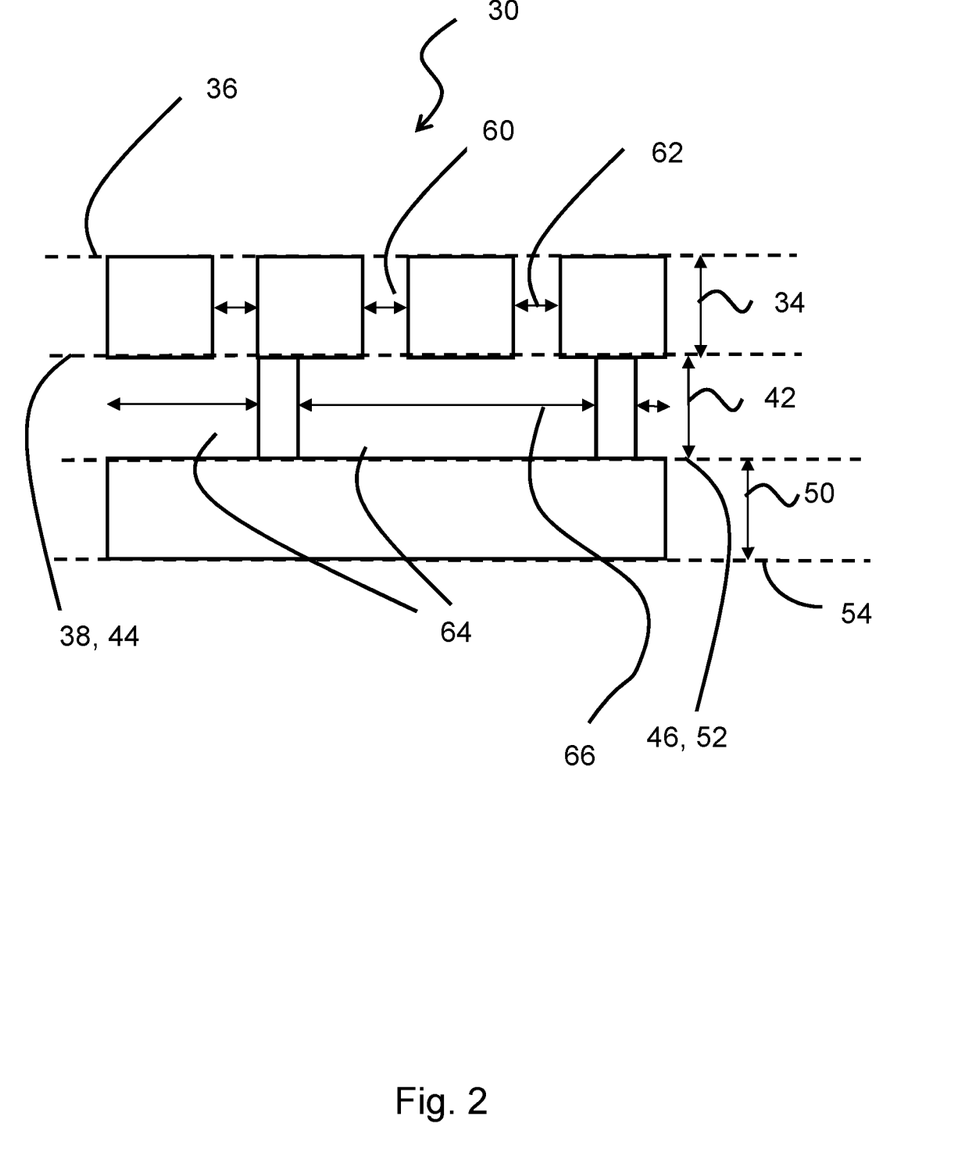
FIG. 2 shows schematically the definitions of terms used in describing the geometry of a metallurgical vessel according to the present invention.

FIG. 2 depicts a lining structure 30 according to the present invention. First layer 34 has a first layer first major surface 36 and a first layer second major surface 38 disposed opposite to the first layer first major surface 36. Second layer 42 has a second layer first major surface 44 and a second layer second major surface 46 disposed opposite to the second layer first major surface 44. The first layer second major surface 38 is in contact with the second layer first major surface 44. Third layer 50 has a third layer first major surface 52 and a third layer second major surface 54 disposed opposite to the third layer first major surface 52. The first layer 34 comprises a plurality of perforations 60 passing from the first layer major surface 36 to the first layer second major surface 38. Element 62 is the cross section of a perforation in the plane of the drawing. The second layer 42 is shown as comprising at least one manifold volume 64 in fluid communication with at least one first layer perforation 60. The at least one manifold volume 64 is in fluid communication with the second layer second major surface 46. Element 66 is the cross section of a manifold volume 64 in the plane of the drawing.

Figure 3:
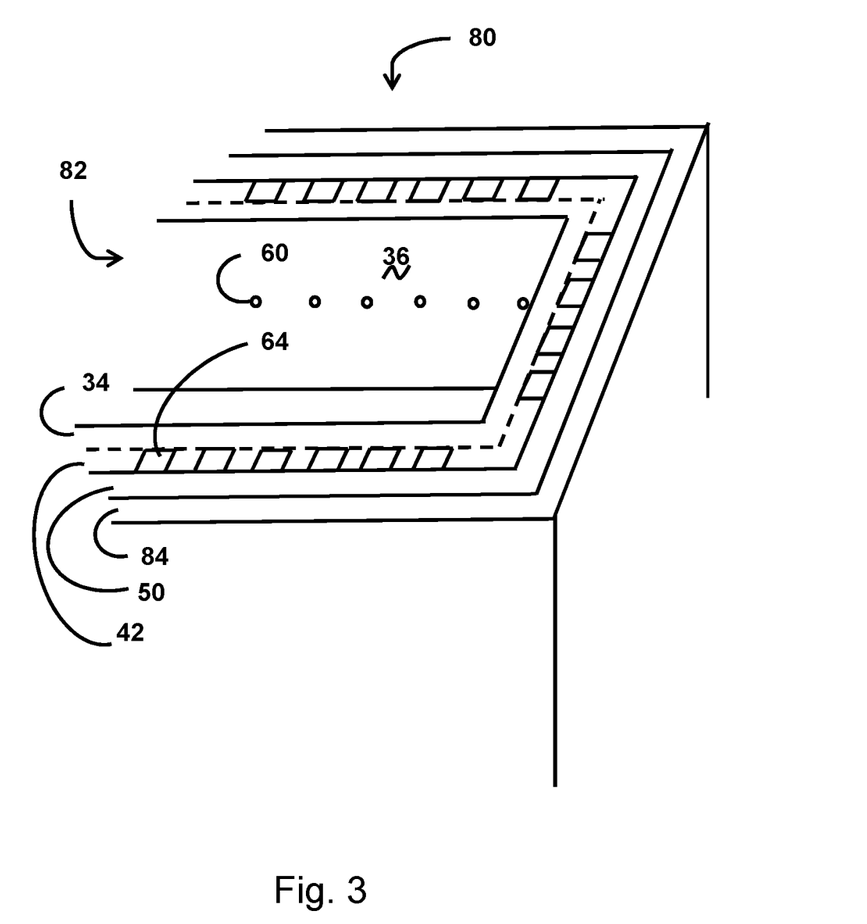
FIG. 3 is a perspective drawing of a metallurgical vessel containing a lining structure according to the present invention.

FIG. 3 depicts a metallurgical vessel 80 containing a lining structure according to the present invention, and having an interior volume 82. Element 84 is the shell, insulating layer and refractory safety layer within which the lining structure is contained. Element 84 is in communication with third layer or backing layer 50. Third layer or backing layer 50 is in communication with second layer 42. Second layer 42 is in communication with first layer 34. Second layer 42 contains a plurality of manifold volumes 64. An exposed first layer first major surface 36 contains perforations 60 through which fluid communication is provided between interior volume 82 and manifold volumes 64. In use, molten metal is introduced into interior volume 82. A portion of the molten metal is admitted, through perforations 60, into the manifold volumes 64. The movement of molten metal in manifold volumes 64 is constrained. The metal in manifold volumes 64 may remain entirely or partially in the molten state, or may partially or entirely undergo a phase change to the solid state. It is believed that metal in either phase would contribute to the operation of the invention, as molten metal would react with species emitted by backing layer 50 to prevent them from passing into interior volume 82, and solid metal would provide a physical barrier to species emitted by backing layer 50.

Figure 4:
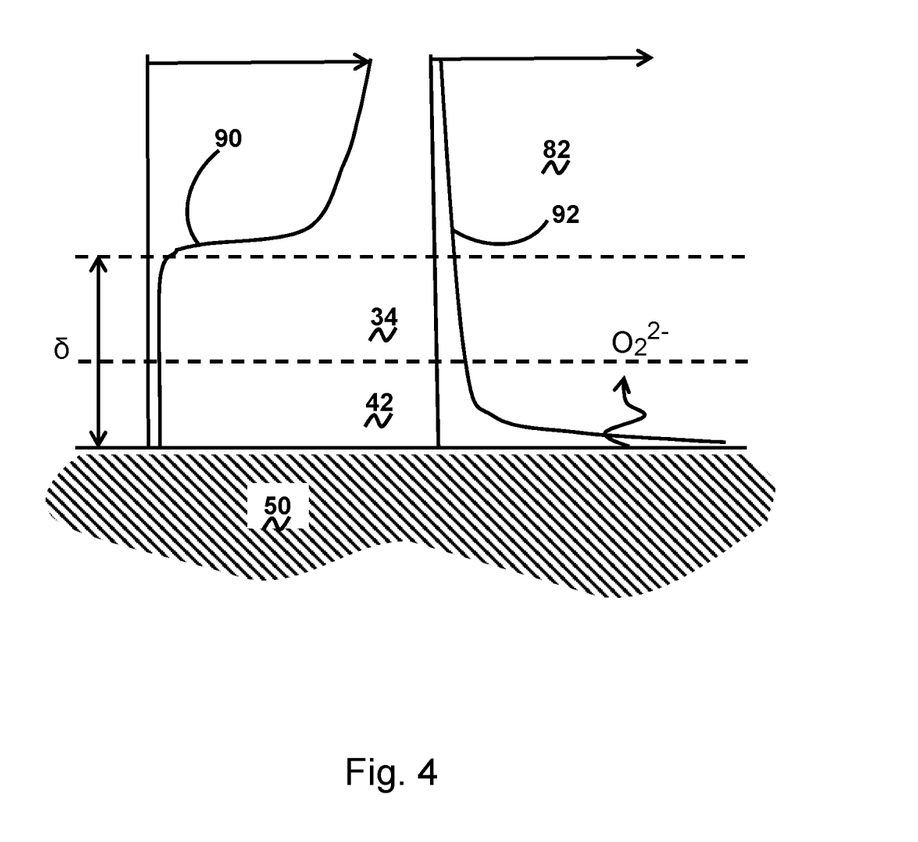
FIG. 4 shows a schematic representation of the metal flow rate, Q and iron oxide concentration as a function of distance from a wall or floor of a metallurgical vessel according to the present invention.

FIG. 4 depicts graphs of properties within a metallurgical vessel containing a lining according to the invention. Properties are shown with respect to distance from the third layer 50 of a lining of the present invention, wherein the flow rate, Q, of metal melt is substantially zero over a distance, $\delta$, from the third layer 50 of the lining, which may be a wall or floor lined with a refractory material. This interphase of thickness b is called an "oxidation buffering layer." In this embodiment it corresponds to the thickness of a first layer 34 supported by a second layer 42. First layer 34 is in communication with the interior volume 82 of the metallurgical vessel. Plot line 90 indicates metal flow rate with respect to distance from third layer 50, with values increasing from left to right. Plot line 92 indicates concentration of oxides with respect to distance from third layer 50, with values increasing from left to right.

Figure 5:
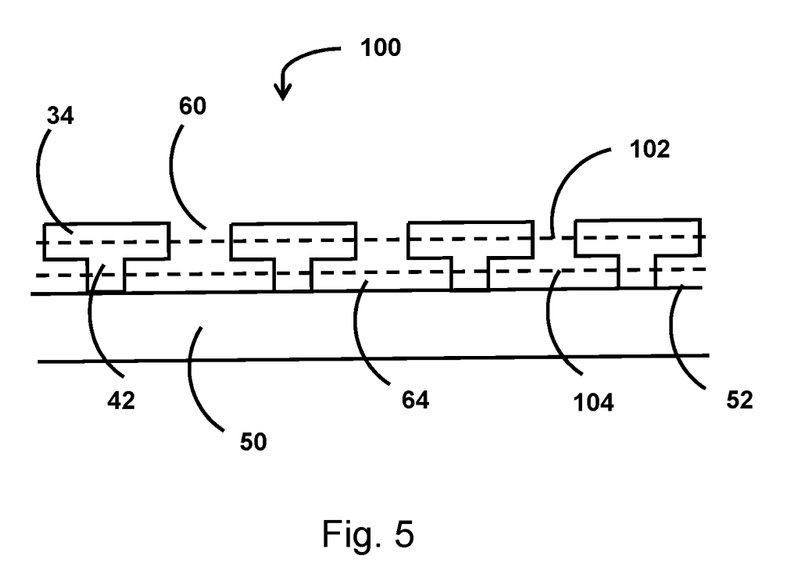
FIG. 5 shows schematically the definitions of terms used in describing the geometry of a metallurgical vessel according to the present invention.

FIG. 5 depicts a cross section 100 of a lining of the present invention. First layer 34 is supported by a second layer 42, which is in turn supported on third layer first major surface 52 of third layer 50. First layer 34 contains perforations 60 providing fluid communication between vessel interior volume 82 and manifold volumes 64. First layer internal major plane 102 is a plane contained within first layer 34 and parallel to third layer first major surface 52 of third layer 50. Second layer internal major plane 104 is a plane contained within second layer 42 and parallel to third layer first major surface 52 of third layer 50.

A configured perforated structure of the present invention may be installed on a backing lining of a refractory vessel placing a sacrificial structure in contact with the backing lining. The sacrificial structure is configured so that, when it is removed by combustion, heat, chemical or physical action, first and second layers will be formed that will have structures enabling them to function according to the present invention. Sacrificial structures may be constructed of cellulosic, plastic, or other organic materials, graphitic materials, glasses, permeable minerals, gaseous materials or metals, and combinations thereof. The material used in the sacrificial structure may take the form of a sheet, powder, sprayed slurry or gel. One or more refractory materials are then applied to the sacrificial structure to provide, after removal of the sacrificial structure, first and second layers according to the present invention. The refractory materials may be applied by gunning, spray, trowelling, casting, dry-vibration application, shotcreting, grouting, pouring, injection, or placement of preformed pieces. The refractory materials may then be dried, cured or stabilized to solidify them as necessary. The resulting layered structure is then exposed to physical or chemical action to remove or transform the sacrificial structure to create manifold volumes in the second layer that may be in fluid communication with the interior of the metallurgical vessel.

A configured perforated structure of the present invention may be installed on a backing lining of a refractory vessel by providing a preformed structure to serve as the first layer, and placing the preformed structure in proximity to a third layer. The first layer and third layer may communicate with each other by way of standoffs protruding from the first layer, by way of standoffs protruding from the third layer, or by way of spacers disposed between the first layer and the third layer. The second layer is formed between the first layer and the third layer, and a manifold volume is formed in a volume of the second layer not occupied by standoffs, spacers or other support structures. Standoffs, spacers or other support structures may be disposed to provide a second layer having a thickness from and including 0.25 mm, 1 mm, 2 mm, 3 mm, 4 mm, 5 mm, 6 mm, 7 mm, 8 mm, 9 mm and 10 mm to and including 5 mm, 6 mm, 7 mm, 8 mm, 9 mm, 10 mm, 15 mm, 20 mm, 30 mm, 40 mm, 50 mm, 60 mm, 70 mm, 80 mm, 90 mm and 100 mm.

The perforations in the first layer may have any structure that permits flow from the body of a metal melt through the first layer to a manifold volume of the second layer. The perforations in the first layer may take any form, or combination of forms, that enables them to function according to the invention. The perforations have a cylindrical, prismatic or truncated conic shape. Perforations may have a beveled, conical, right-angle or rounded profile at their intersection with the first surface of the first layer. Perforations in the first layer may take the form of channels or slits or gaps formed between adjacent panels in configurations in which the first layer comprises an array of adjacent panels. The channels or slits or gaps may form a continuous network. Individual channels or slits or gaps separating a pair of adjacent panels may be continuous or may be discontinuous. The panels may be provided with standoffs that may be oriented towards the third layer. Perforations may be formed by mechanical methods, such as removal of a sacrificial material, by punching, or by drilling.

The perforations in the first layer may be formed by providing a sacrificial material in a monolithic material applied to the third layer, in conjunction with, or in the absence of, a sacrificial structure in communication with the third layer. The sacrificial material and the sacrificial structure may then be removed or transformed by methods described previously.

The manifold in the second layer may take the form of a volume in which the spacing between the first layer and the third layer is maintained by cylindrical forms, conical solid forms, rectangular prism forms, polygonal prism forms, spheres, or ribs.

Figure 6:
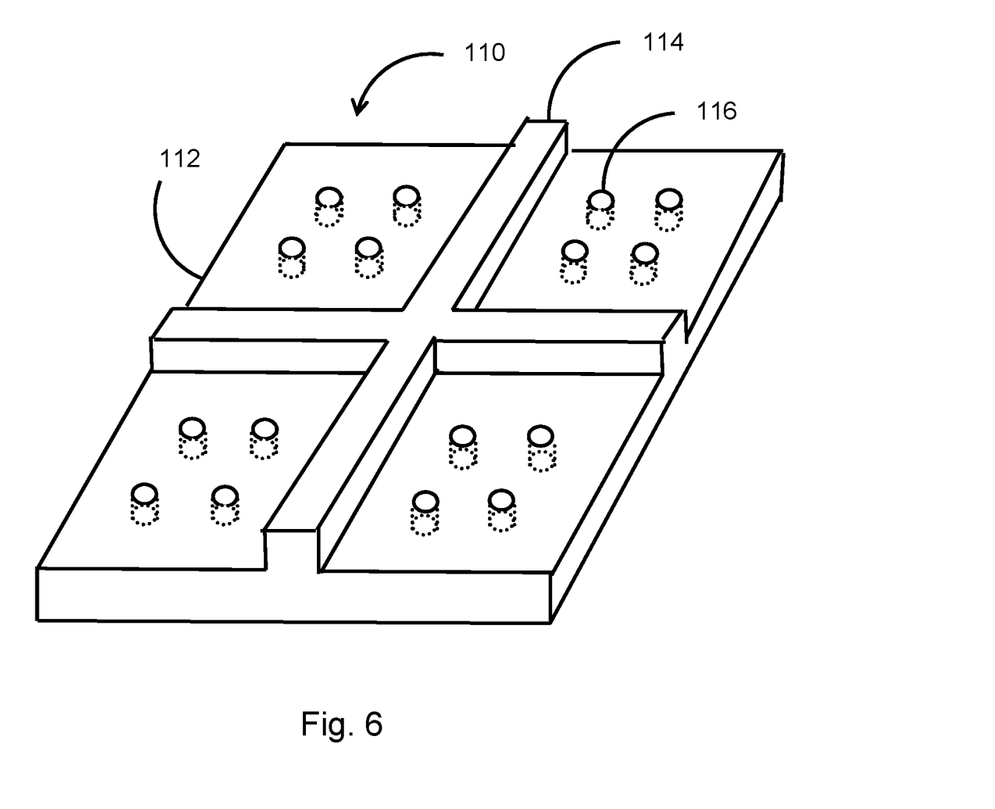
FIG. 6 is a perspective drawing of a portion of a sacrificial structure for use in the casting of the perforated structure of a lining of the present invention.

FIG. 6 depicts a sacrificial structure 110 that may be used to form a configured perforated structure according to the present invention. The sacrificial structure contains a sacrificial manifold pattern 112 in communication with a first layer perforation pattern 114. The sacrificial manifold pattern 112 may include second layer standoff perforations 116 that provide communication between the first layer and a third layer installed in a refractory vessel. In use, the sacrificial structure 110 is placed in communication with the third layer so that the sacrificial manifold pattern 112 is in communication with the third layer. Refractory material is then cast on the first layer perforation pattern so that first layer panels are formed between components of the first layer perforation pattern 114, and so that cast material fills the second layer standoff perforations 116. Alternatively, the sacrificial structure 110 may be configured to mate with the third layer so that protrusions from the third layer occupy at least a portion of second layer standoff perforations 116. The cast material filling the second layer standoff perforations 116 forms standoff structures between the first layer of the configured perforated structure and the third layer of the refractory vessel lining. The sacrificial material may then be removed by processes described previously. The first layer of the configured perforated structure, resulting from cast material filling empty volumes in the first layer perforation pattern 114, contains perforations that may take the form of channels or slits or gaps between adjacent panel structures. The channels or slits or gaps may be continuous along an edge of a panel structure, or may be discontinuous. The channels or slits or gaps may define a separation between panels from and including 0.1 mm to and including 10 mm, from and including 0.5 mm to and including 10 mm, from and including 1 mm to and including 10 mm, from and including 2 mm to and including 10 mm, from and including 5 mm to and including 10 mm, from and including 0.1 mm to and including 20 mm, from and including 0.5 mm to and including 20 mm, from and including 1 mm to and including 20 mm, from and including 2 mm to and including 20 mm, from and including 5 mm to and including 20 mm, from and including 0.1 mm to and including 30 mm, from and including 0.5 mm to and including 30 mm, from and including 1 mm to and including 30 mm, from and including 2 mm to and including 30 mm, and from and including 5 mm to and including 30 mm. A slit is a long, narrow opening. A slit may have length that is equal to or more than an order of magnitude greater than its width.

A vessel constructed according to the present invention may be used in metallurgical processes. A method of use may include introducing a molten metal into a vessel having a lining according to the present invention, and subsequently removing the molten metal from the vessel through a nozzle.

Example I

Sample panels of a multi-layer tundish lining with a fugitive (or sacrificial) inner (or second) layer were prepared. The fugitive inner layer is configured to separate the first (or outer) layer and the third (or backing) layer during the production of a panel.

The sacrificial layer may be formed from polystyrene sheet, foamed polyethylene sheet, cardboard, foam polymer or corrugated sheet or any similar material that will burn off under 2000 degrees F. (1100 degrees C.) and leave minimum residue behind. For the specific examples described, cardboard having corrugations on each side (heavy duty B flute) was used. The height of the corrugations on each side of the cardboard was approximately 3 mm.

Steel entry hole formers were used to produce holes in the corrugated cardboard. Wooden dowels having a diameter of 3 mm and a length of 38 mm were inserted into the holes perpendicular to the plane of the cardboard.

Five panels were prepared for testing.

Base panels were prepared from an ultralow cement alumina castable similar to the material used as safety lining inside a steel tundish. The dimensions of each base panel were 36 inches×24 inches×5 inches (90 cm×60 cm×12.5 cm). First, a tundish lining material (Basilite, a lightweight magnesite-based spray material containing >70 wt % magnesia) was sprayed over the base panel to about 1 inch (2.5 cm) thickness, using a Basilite spray machine. Sacrificial layer sheets (20 inches×12 inches, or 50 cm×30 cm) having different opening configurations according to Table I were then securely pressed against the Basilite lining. Then, an alumina based material (alumina >80 wt %) was sprayed to a thickness of about 1 inch (2 cm) all over the surface.

In the panels in which two separate side-by-side sacrificial layer sheets were used (panels 2, 3, and 4), the side-by-side sacrificial layer sheets were arranged so as to be separated by a gap of approximately one inch (2.5 cm).

In the construction of selected panels, rectangular openings were provided in the sacrificial layer sheets. The rectangular openings in the sacrificial layer sheets measured 1"×6" (2.5 cm×15 cm). The volumes of these openings were filled with refractory material during the construction of the panel, so that direct contact was made, through the openings, between the linings in contact with each of the surfaces of the sacrificial layer sheets.

TABLE I

| PANEL | DESCRIPTION |
| --- | --- |
| 1 | No sacrificial layer sheet |
| 2 | Two (side-by-side) sacrificial layer sheets<br>a) sacrificial layer sheet with 22 transverse dowels, one rectangular opening with longitudinal direction of opening oriented to longitudinal direction of panel.<br>b) sacrificial layer sheet with 21 transverse dowels, two rectangular openings arranged end-to-end with longitudinal direction of openings oriented to longitudinal direction of panel. |
| 3 | Two (side-by-side) sacrificial layer sheets<br>a) sacrificial layer sheet with 25 transverse dowels, two rectangular openings arranged along a panel-corner-to-panel-corner diagonal line, with longitudinal direction of openings oriented to longitudinal direction of panel. |

TABLE I-continued

PANEL DESCRIPTION

| | |
|---|---|
| | b) sacrificial layer sheet with 10 transverse dowels, three rectangular openings arranged along a panel-corner-to-panel-corner diagonal line, with longitudinal direction of openings oriented to longitudinal direction of panel. |
| 4 | Two (side-by-side) sacrificial layer sheets<br>a) sacrificial layer sheet with 14 transverse dowels, two rectangular openings arranged side-by-side and oriented perpendicular to longitudinal direction of panel.<br>b) sacrificial layer sheet with 8 transverse dowels, three rectangular openings arranged side-by-side and oriented perpendicular to longitudinal direction of panel. |
| 5 | One sacrificial layer sheet with no transverse dowels, with three rectangular openings: one at each end of the sacrificial layer panel oriented perpendicular to the longitudinal direction of the panel, and one opening located at the center of the sacrificial layer sheet and oriented to the longitudinal direction of the panel. |

Panels 1, 2, 3, and 4 remained intact after spraying with alumina spray. On panel 5, the sprayed alumina began to slide downward. A visible crack was produced in the alumina surface of panel 5.

After three hours of hot air drying, all of the panels were vertically lifted and moved to the furnace floor.

It was observed that delamination and flattening of corrugated cardboard occurred when it was wet and unsupported, as in the case of panel 5. The surface flatness of the Basilite lining is important in the proper placing of the fugitive layer. Making holes after spraying the alumina-based layer, and placing dowels in the holes, may work only if the cardboard is supported after spraying the Basilite layer.

The panels were then placed on a furnace floor for drying at 900 degrees Fahrenheit (480 degrees Celsius). After firing, panels 1 and 2 exhibited no significant parting cracks. Panels 3, 4 and 5 exhibited a parting crack, predominantly at the base panel—Basilite interface.

A gap continuity check was performed on panel 2. Ink was introduced into an opening formed in the first (or outer) layer of the panel. The ink was observed to flow to other openings formed in the first layer of the panel, thus confirming the formation of a network of manifold volumes extending across the entire area formed by removal of the sacrificial layer.

A decreased bond strength of both Basilite and alumina was observed in the contact areas produced by rectangular slots in the fugitive layer.

Example II

A portion of multi-layer material was removed from a panel formed according to the description in Example I, and was set for firing at 2000 degrees F. (1100 degrees C.) for 2 hours. The cardboard fugitive layer was found to leave a residue of 9 wt % by weight after the firing, having an LOI (loss on ignition) value of 90.8 wt %. The residue contained 15.51 wt % $Al_2O_3$, 23.84 wt % $SiO_2$, 51.32 wt % CaO, 3.15 wt % MgO, 0.70 wt % $Na_2O$, 0.330 wt % $P_2O_5$, 1.63 wt % $Fe_2O_3$, 0.62 wt % $K_2O$, 0.019 wt % $Cr_2O_3$, 1.020 wt % $TiO_2$, and 0.053 wt % $ZrO_2$.

The fugitive inner layer is converted to ash or other residue after the panels are fired. In this case, the majority of the residue came from the processing additives used for the manufacturing of corrugated cardboard.

Numerous modifications and variations of the present invention are possible. It is, therefore, to be understood that within the scope of the following claims, the invention may be practiced otherwise than as specifically described.

We claim:

1. A refractory lining structure for a metallurgical vessel, comprising
   a) a first layer, comprising a refractory material, the first layer having a first layer first major surface and a first layer second major surface disposed opposite to the first layer first major surface, and
   b) a second layer having a second layer first major surface and a second layer second major surface disposed opposite to the second layer first major surface;
   wherein the lining structure comprises a second layer internal major plane;
   wherein the first layer second major surface is in contact with the second layer first major surface;
   wherein the first layer comprises a plurality of perforations passing from the first layer first major surface to the first layer second major surface, wherein the perforations have a summed cross-sectional area;
   wherein the second layer comprises at least one manifold volume or void, wherein the at least one manifold volume is in fluid communication with at least one first layer perforation, and wherein the at least one manifold volume is in fluid communication with the second layer second major surface, wherein the at least one manifold has a summed maximum cross-sectional area in a plane parallel to the lining structure major plane;
   wherein the summed cross-sectional area of all perforations in the first layer is less than the summed maximum cross-sectional area of all manifold volumes in the second layer; and
   the refractory lining structure comprises a configuration selected from the group consisting of:
      (a) the second layer comprising a plurality of stand-off structures protruding from the second major surface of the first layer;
      (b) the refractory lining structure further comprising a nonperforated third layer comprising a refractory material, the third layer having a third layer first major surface in communication with the second layer second major surface, wherein the second layer comprises a plurality of stand-off structures protruding from the third layer first major surface; and
      (c) the refractory lining structure further comprising a nonperforated third layer comprising a refractory material, the third layer having a third layer first major surface in communication with the second layer second major surface, wherein the second layer comprises a plurality of spacers disposed between the first layer and the third layer.

2. The refractory lining structure of claim 1, wherein the second layer comprises a plurality of stand-off structures protruding from the second major surface of the first layer, and wherein the first layer and the plurality of stand-off structures protruding from the second major surface of the first layer comprise a single monolithic structure.

3. The refractory lining structure of claim 1, wherein the first layer is comprised of a material selected from the group consisting of magnesia, alumina, zirconia, mullite, and combinations of these materials.

4. The refractory lining structure of claim 1, wherein the summed maximum cross-sectional area of all manifold volumes in the second layer is at least a factor of 10 greater than the summed cross-sectional area of all perforations in the first layer.

5. The refractory lining structure of claim 1, wherein the second layer comprises a plurality of stand-off structures protruding from the second major surface of the first layer.

6. The refractory lining structure of claim 1, wherein the at least one manifold volume comprises at least one alcove.

7. The refractory lining structure of claim 1, wherein the at least one manifold volume comprises at least one groove.

8. The refractory lining structure of claim 1, wherein the first layer has a thickness in the range from and including 5 mm to and including 100 mm.

9. The refractory lining structure of claim 1, wherein the second layer has a thickness in the range from and including 1 mm to and including 50 mm.

10. The refractory lining structure of claim 1, further comprising a nonperforated third layer comprising a refractory material, the third layer having a third layer first major surface in communication with the second layer second major surface.

11. The refractory lining structure of claim 10, wherein the second layer comprises a plurality of stand-off structures protruding from the third layer first major surface.

12. The refractory lining structure of claim 1, wherein the perforations have a flared geometry at their intersection with the first layer first major surface.

13. The refractory lining structure of claim 1, wherein the perforations have a cross-section geometry selected from the group consisting of circular geometry, elliptical geometry, oval geometry, square geometry, rectangular geometry, polygonal geometry, parallelogram geometry, and lens geometry.

14. The refractory lining structure of claim 1, wherein the perforations have a minimum cross-sectional diameter from and including 2 mm to and including 50 mm.

15. The refractory lining structure of claim 1, wherein the first layer comprises an array of adjacent panels, and wherein the perforations comprise a plurality of slits described by adjacent panels.

16. A metallurgical vessel comprising a floor surrounded by at least one wall, the floor comprising at least one outlet, and the metallurgical vessel comprising an interior and an exterior, wherein at least a portion of the interior of the metallurgical vessel comprises a refractory lining structure according to claim 10.

* * * * *